United States Patent Office

2,880,224
Patented Mar. 31, 1959

2,880,224

PROCESS FOR THE PREPARATION OF ALKYL PHOSPHONATES

Charles J. Smith, Jr., Grand Island, N.Y., assignor to Olin Mathieson Chemical Corporation, a corporation of Virginia No Drawing. Application January 16, 1953
Serial No. 331,731

6 Claims. (Cl. 260—461)

My invention relates to a method for the preparation of phosphonates of the formula $(RO)(R'O)P(O)R''$ in which R, R' and R'' are alkyl radicals.

It is old in the art to prepare compounds falling within the scope of the foregoing formula by reacting a di-alkyl hydrogen phosphite with an alkali metal which has been dispersed in a partially hydrogenated terphenyl, thereby forming an alkali metal salt of the dialkyl hydrogen phosphite, and thereafter reacting such salt with an alkyl halide. The steps can be represented by the following reactions:

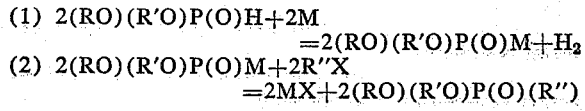

in which R, R' and R'' are alkyl radicals, M is an alkali metal atom and X is a halogen atom.

More specifically, metallic sodium has been dispersed in a partially hydrogenated terphenyl and the dispersion then contacted under reaction conditions with di-isopropyl hydrogen phosphite, thereby forming di-isopropyl sodium phosphite in solution and evolving hydrogen. The solution containing the di-isopropyl sodium phosphite has then been contacted under reaction conditions with methyl chloride, thereby forming the compound $(i\text{-}PrO)_2P(O)CH_3$ in solution and also sodium chloride, which remains dispersed in the solution. This mixture has then been passed to a distilling column which has been operated under a high vacuum, the desired product being removed as overhead and a dispersion of sodium chloride in the partially hydrogenated terphenyl being removed as bottoms from the column.

The prior art procedure involving the use of partially hydrogenated terphenyl is subject to certain serious drawbacks. In the first place, the hydrogen formed in the reaction of Equation 1 frequently causes excessive foaming which necessitates slowing down the throughput of given apparatus or even completely halting the operation of such apparatus. Moreover, the desired product cannot be adequately separated from the partially hydrogenated terphenyl. Thus, in order for the desired product to be completely stripped from the solvent in the vacuum distilling column, it is essential that the liquid at the bottom of the column be boiling. However, the boiling point of partially hydrogenated terphenyl at an absolute pressure of about 10 mm. of mercury or any other low absolute pressure that can economically be obtained in practice is so high that if the liquid at the bottom of the column is boiled excessive decomposition of the product occurs. As a result, when using partially hydrogenated terphenyl as a solvent it is necessary that the liquid leaving the bottom of the column be substantially below its boiling point in order that excessive product decomposition will not take place. In practice, optimum vacuum distilling requires that the liquid leaving the bottom of the column contain about 3.5 percent of product, based upon the amount of liquid leaving the bottom of the column. This amounts to about 13 percent of the product produced in the process and is much too high for satisfactory commercial operation. Also, difficulty is encountered in washing the salt from the solvent stream leaving the bottom of the vacuum distilling tower in order that the solvent can be again used in the process.

In attempting to find a solvent which represents an improvement over partially hydrogenated terphenyl when used in the general procedure described above, it is insufficient that such solvent not result in excessive foaming, be one from which the desired product can be conveniently removed by means of vacuum distillation and be one from which the salt formed can be easily washed. In addition to these requirements, a new solvent in order for it to provide an improved overall operation must be one which does not react with the alkali metal and must be one in which the di-alkyl sodium phosphite forms a dispersion which is stable against settling.

In accordance with my present invention, I have discovered that the eutectic mixture of di-phenyl ether and di-phenyl in a weight ratio of about 73.5 to 26.5, respectively, when used as a solvent in the process, provides definite advantage in that it does not react with the alkali metal, does not result in excessive foaming and provides for proper dispersion of the di-alkyl sodium phosphite. At the same time, when the aforementioned eutectic is used, the desired product can be substantially completely stripped from the eutectic by means of vacuum distillation and the dispersion of alkali metal salt in the eutectic can be easily washed in order to render the eutectic suitable for further use in the process.

The following example illustrates in detail an embodiment falling within the scope of my invention. In the example, the parts and percentages are by weight, unless otherwise specified.

*Example*

80 parts of Dowtherm A (a proprietary product, being the eutectic mixture of diphenyl ether and diphenyl in a weight ratio of about 73.5 to 26.5, respectively), was heated to 110° C., after which 14 parts of sodium chunks was added and the sodium dispersed by vigorous stirring. This procedure provided a sodium dispersion containing about 15 percent by weight of sodium. In another vessel a mixture of 100 parts of di-isopropyl hydrogen phosphite and 164 parts of Dowtherm A was heated to 65° C. The sodium dispersion was then added to the di-isopropyl hydrogen phosphite-Dowtherm A mixture at a rate such that a reaction temperature of 110° C. was maintained. The product was a yellow solution, the color being that characteristic of Dowtherm A. The reaction mixture was then cooled to 70–75° C. and a 30 percent stoichiometric excess of methyl chloride in gaseous form was passed in while the reaction mixture was cooling in order to maintain the reaction temperature within the range 70–90° C. No foaming occurred during this entire procedure. At the conclusion of the reaction, the reaction mixture appeared to be clear upon visual examination, indicating that the sodium chloride was dispersed in extremely finely divided form. When the reaction mixture was permitted to stand and cool overnight, some crystallization of the sodium chloride took place. After having been permitted to stand overnight, the reaction mixture was subjected to a first, relatively inefficient vacuum distillation. When this was done, the reaction mixture cleared up shortly after the distillation had been started. This distillation was conducted at an absolute pressure of 5 mm. of mercury and overhead was taken until the vapor temperature at the top of the column reached 70° C. The amount of this crude overhead was 105 parts and it had a $n_D^{25}$ of 1.4275.

The bottoms in the column at the conclusion of this first distillation was creamy, there being no distinct crystalline separation. The crude overhead from the first vacuum distillation was then subjected to a relatively more efficient vacuum distillation at an absolute pressure of 10 mm. of mercury. In this distillation, three cuts were taken, the first amounting to 33 parts boiling within the range 69–72° C. (pot temperature, 95° C.) and having a $n_D^{25}$ of 1.4082, the second amounting to 57 parts boiling within the range 69–71° C. and having a $n_D^{25}$ of 1.4095 and the third amounting to 5 parts having a $n_D^{25}$ of 1.4170. The desired product when in absolutely pure form has a $n_D^{25}$ of 1.4080, so that the first cut taken was pure for all practical purposes and the second cut contained about 1 percent of Dowtherm A. 85 percent of the di-isopropyl hydrogen phosphite was converted to the desired product.

Various modifications can be made in the procedure just described to provide other embodiments which fall within the scope of my invention. Hence, in place of the di-isopropyl hydrogen phosphite there can be used other di-alkyl hydrogen phosphites, preferably those containing not more than 8 carbon atoms, for example, di-methyl hydrogen phosphite, di-ethyl hydrogen phosphite, di-n-butyl hydrogen phosphite, di-2-ethylhexyl hydrogen phosphite, and so forth. Potassium can also be used in place of sodium. The reaction conditions used in forming the alkali metal salt of the di-alkyl hydrogen phosphite are substantially those which have heretofore been used in the prior art processes involving the use of partially hydrogenated terphenyl as the solvent, the di-alkyl hydrogen phosphite and alkali metal preferably being employed in their stoichiometric proportions.

In place of the methyl chloride, there can be used other alkyl halides, preferably those having from 1 to 4 carbon atoms, such as ethyl chloride, n-propyl bromide, n-butyl chloride, and so forth. Here again, the reaction conditions employed are essentially those of the prior art, a 10 to 50 percent stoichiometric excess of the alkyl halide preferably being used in order to insure complete conversion of the alkali metal salt to the desired product and a reaction temperature of about 70 to about 110° C. preferably being used. The degree of vacuum employed in recovering the product is not critical, absolute pressures within the range from about 5 to about 50 mm. of mercury being preferred, and the process being carried out in such manner as to provide a product having a boiling point of at least 10° C. and preferably 25° C. lower than the boiling point of the eutectic under the conditions prevailing in the vacuum distillation column, in order to insure complete product recovery.

I claim:
1. A method for the preparation of a compound of the generic formula (RO)(R'O)P(O)(R") which comprises reacting a compound of the formula

(RO)(R'O)P(O)H with an alkali metal while the alkali metal is dispersed in a liquid which consists essentially of the eutectic mixture of diphenyl ether and diphenyl in a weight ratio of about 73.5 to 26.5, respectively, to form an alkali metal salt of the compound of the formula (RO)(R'O)P(O)H reacting the alkali metal salt while dissolved in the eutectic with a compound of the formula R"X to form a mixture consisting essentially of a solution of the compound of the formula (RO)(R'O)P(O)(R") in the eutectic having dissolved therein a salt of the alkali metal and X, subjecting said mixture to vacuum distillation and removing a compound of the formula (RO)(R'O)P(O)(R")

as overhead and a dispersion of the salt of the alkali metal and X in the eutectic as bottoms, R, R' and R" being lower alkyl radicals, the alkali metal being selected from the group consisting of sodium and potassium and X being selected from the group consisting of chlorine and bromine.

2. A method according to claim 1 in which X is chlorine.
3. A method according to claim 1 in which the alkali metal is sodium.
4. A method according to claim 1 in which the reaction between the compound R"X and the alkali metal salt of the compound of the formula (RO)(R'O)P(O)H is carried out at a temperature within the range from about 70 to about 110° C.
5. A method according to claim 1 in which the sum obtained by adding the number of carbon atoms in R to the number of carbon atoms in R' does not exceed 8 and in which the number of carbon atoms in R" does not exceed 4.
6. A method according to claim 1 in which R is isopropyl, R' is isopropyl, R" is methyl, X is chlorine and the alkali metal is sodium.

References Cited in the file of this patent
UNITED STATES PATENTS

| 2,553,417 | Lodd et al. | May 15, 1951 |
| 2,616,918 | Johnson | Nov. 4, 1952 |